United States Patent Office 2,924,598
Patented Feb. 9, 1960

2,924,598

DERIVATIVES OF THEOPHYLLINE AND METHODS OF PREPARING SAME

August Heinrich Walter Bestian, Gronau, Hannover, Germany, assignor to Firma Johann A. Wülfing, Dusseldorf, Germany, a firm of Germany No Drawing. Application October 27, 1958
Serial No. 769,563

Claims priority, application Germany
October 26, 1957

5 Claims. (Cl. 260—253)

This invention relates to theophylline derivatives which are substituted in the 7-position by an amino alcohol rest (radical), the salts thereof, and methods of preparing said derivatives. More particularly, said derivatives corresponding to the general formula:

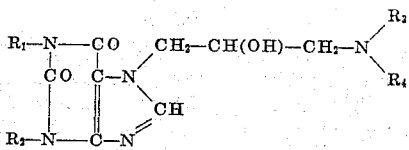

Formula I wherein $R_1$ and $R_2$ are alkyl radicals, $R_3$ is an alkyl or hydroxy alkyl, and $R_4$ designates alkyl or hydroxyalkyl. $R_3$ and $R_4$ together with the N-atom may be a heterocyclic ring.

The free base products of this invention are highly viscous oily substances. They are difficult to crystallize and are very readily soluble in water with a strong alkaline reaction. With organic and inorganic acids they form salts, some of which have a very good crystallization ability. Among those, the salts of the nicotinic acids show particularly interesting properties in pharmaceutical tests. In clinical use these compounds, the nicotinic acid salts, have an excellent, pronounced and long-lasting effect upon the peripheral vessels so that they can be used as products for the treatment of vascular diseases.

The compounds may be prepared by reacting a xanthine compound of the general formula:

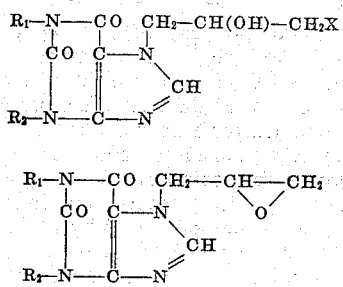

or wherein $R_1$ and $R_2$ have the aforestated significance and X is a halogen atom, in known manner, with the secondary amine at elevated temperature.

The 7-($\gamma$-chloro-$\beta$-hydroxy-propyl)-xanthine compounds used as the starting material are known. The preparation thereof is described in German Patent 224,-159; Chemisches Zentralblatt 1910, II, 156.

The reaction of the xanthine chlorohydrins with the secondary amines is preferably carried out in an organic solvent such as, ethanol, propanol, isopropanol, butanol, benzene or toluene, by heating. Amines having a comparatively low boiling point, as for instance, dimethylamine and diethylamine, can be reacted, due to their high volubility, only under pressure in an autoclave. In order to obtain a smooth reaction of the xanthine chlorohydrins with the secondary amines, and hence a high yield, it is necessary to use double the molar quantity of the amine, whereby one mol of the amine is consumed for binding the hydrogen halide. Hence, recovery is necessary which often entails losses and makes the process more expensive.

For technical purposes, and in particular when it is intended to produce salts of the organic acids from the formed raw xanthine bases, it is a material advantage to carry out the reaction with molar quantities of amine and xanthine chlorohydrins, because an excess of amine either disturbs the formation of the pure salt or makes it impossible.

The reaction of the xanthine chlorohydrins with the secondary amines in molar quantities is carried out in the presence of 1 mol of an alkali hydroxide or an alkali alcoholate which binds the hydrogen halide by forming the alkali halide and can be very readily separated from the reaction solution by filtration after completion of the reaction.

There is no doubt that in such event, the 7-epoxy-alkyl-xanthines are formed in the first step from the xanthine chlorohydrins, and that the 7-epoxy-alkyl-xanthines are split in the succeeding stage in known manner with the basic amine with the amino alcohols.

There are very numerous amines suitable for the method. In addition to the aliphatic secondary amines with a short chain, such as, diethylamine, dipropylamine and dibutylamine, the heterocyclic amines, such as morpholine, piperidine, pyrrolidine and monoalkylated piperazines, and also secondary amino alcohols, as for instance, methylamino-ethyl alcohol, ethylamino-ethyl alcohol, methylamino-propyl alcohol, and others, are particularly suitable.

It was further found that the same products can be obtained with very good yields and in substantially purer condition by the reaction of theophylline with halogen containing alkanol-amines of the general formula:

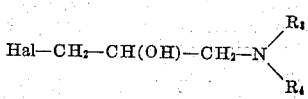

in which Hal-, $R_3$ and $R_4$ have the above given significance, in solvents containing hydroxyl groups and in the presence of alkalis.

The employed alkanolamines are readily obtained by condensation of epihalogen hydrins, as for example, epichlorohydrin and secondary amines in a medium containing hydroxyl groups. Since these halogen-containing alkanolamines are comparatively unstable and are readily capable of cyclization in dioxane compounds of the general formula:

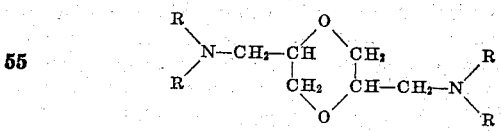

the reaction temperature must be kept comparatively low during the condensation. In accordance with the method, the condensation of molar quantities of epihalogenhydrins and secondary amines is conducted at temperatures of 15 to 30° C. It is not necessary to submit the raw condensation product to a further purification. As halogen containing alkanolamines, for instance, the following compounds may be used for the process: 1-chloro-3-(diethyl-amino)-propanol (2), 1-chloro-3-N-morpholino-propanol (2), 1-chloro-3-N-(N'-oxyethyl-piperazino)-propanol (2), 1-chloro-3-(methyl-oxyethyl-amino)-propanol (2), 1-chloro-3-(dioxyethyl-amino)-propanol (2), etc.

The condensation of these alkanolamines with theophylline is preferably conducted in a hydroxyl-containing solvent especially in a monovalent (monohydric) alcohol, such as, ethyl alcohol, propyl alcohol or isopropyl alcohol. However, the reaction can also be carried out in water quite smoothly and rapidly. Due to the insolubility and the much simpler separation of the alkali halides formed during the reaction process, the reaction in alcohols constitutes a substantial technical advantage.

The binding of the theophylline to the halogenated alkanolamines can be readily carried out with the alkali salt of theophilline, which is difficult to dissolve in alcohols such as ethyl alcohol or isopropyl alcohol, but has sufficient solubility to permit a rapid reaction with the coupling component. According to the invention, the cold alcoholic solution of the alkanolamine is added to the boiling suspension of the theophylline salt to the extent that the condensation progresses. Due to the heat sensitivity thereof, considerable side reactions occur when the halogeno-alkanolamines are rapidly added.

A further modification of the method resides in the fact that the theophylline being a weak acid can form salts with a strong basically reacting halogeno-alkanolamine and thus prevents the tendency of cyclization thereof at an elevated temperature. Due to the formation of a salt, the theophylline which is difficult to dissolve in alcohol can be homogeneously dissolved whereby a rapid reaction progress is assured upon the addition of alkali hydroxide or alkali carbonate. According to the invention, the alcoholic solution of the condensation product from epihalogenhydrin and secondary amines is added at slightly elevated temperature in the molar quantity of theophylline, and an equivalent quantity of alkali hydroxide is added during 1 to 2 hours to the homogeneous solution at the boiling temperature of the alcohol. The rapid reaction progress becomes noticeable by the progressing increase of the separation of alkali halide.

The following are examples in accordance with this invention:

*Example 1*

54.5 parts by weight of 7-(γ-chloro-β-hydroxy)-propyltheophylline are heated in 150 parts by weight of isopropyl alcohol with 15 parts by weight of methyl-amino-ethanol in a steam bath. During the course of 1 hour, 8 parts by weight of caustic soda are added. After 3 hours of boiling the solution is filtered off from the separated sodium chloride and nicotinic acid is added to the clear and still hot solution until a neutral reaction is obtained.

The nicotinate of the 3-(methyl-β-hydroxy-ethyl)-amino-2-hydroxy-propyl-theophylline separates in the form of colorless needles. The salt is recrystalized from 90% alcohol (ethanol) and has a melting point of 179° to 180° C.

*Example 2*

To a well-stirred solution of 740 parts by weight of epichloro-hydrin in 200 parts by volume of isopropyl alcohol are added 600 parts by weight of methylamino ethanol during about 3 hours at 15 to 20° C. The heat generated by the condensation is removed by means of a cooling bath. After the addition of the total quantity of methylamino ethanol, stirring is continued for 1 hour at 25° C. The condensation reaction is completed when development of heat reaction can no longer be observed. The solution thus produced of the raw 1-chloro-3-(methyl-hydroxyethyl-amino)-propanol (2) in isopropyl alcohol is a colorless viscous liquid which is used without further purification for the subsequent condensation with theophylline.

320 parts by weight of caustic soda are dissolved in 200 parts by weight of water and diluted with 6,000 parts by weight of isopropyl alcohol. 1,584 parts by weight of theophylline-hydrate are added to the well-stirred alcoholic caustic soda solution having a temperature between 50 to 60° C. As a result, most of the theophylline sodium salt is precipitated and a doughy or pasty white reaction product is formed. While being stirred and heated to the boiling point of alcohol, the solution of the afore-described 1-chloro-3-(methyl-hydroxyethyl-amino)-propanol (2) is added dropwise into the reaction vessel during about 3 hours. After further cooking for 2 hours, the alcoholic solution of deposited sodium chloride is filtered off. By volatizing the alcohol, the 3-(methyl-hydroxyethyl-amino)-2-hydroxy - propyl - theophylline can be obtained as a very viscous oil which contains impurities in the form of by-products.

For purpose of purification, the hot alcoholic solution is mixed with 975 parts by weight of nicotinic acid while being stirred and heated until the nicotinic acid is completely dissolved.

The 3-(methyl-hydroxyethyl-amino)-2-hydroxy-propyl-theophylline-nicotinate separates, while still being warm, in the form of shiny, thin, small sheets. After cooling, the crystallization product is sucked off from the mother liquor and recrystallized from 85% isopropyl alcohol.

The melting point of the pure nicotinic acid salt is 180° C. and the yield is 75 to 80% related to the used theophylline. The substance has a nearly neutral reaction and is very readily soluble in water.

*Example 3*

740 parts by weight of epichlorhydrin and 600 parts by weight of methyl-amino-ethanol are condensed in 200 parts by volume of isopropyl alcohol in accordance with Example 1, first paragraph. The condensation product is diluted with 5,000 parts by volume of isopropyl alcohol at room temperature. 1,584 parts by weight of theophylline hydrate are added to the well-stirred solution at 30 to 40° C. The theophylline which is difficult to dissolve in isopropyl alcohol, is converted into a clear solution while forming a salt with the basic condensation product. 320 parts by weight of caustic soda in 250 parts by weight of water are added to the reaction solution during about 2 hours while being stirred and boiled. To complete the reaction, the stirring is continued at boiling temperature for 2 hours. The deposited sodium chloride is separated by filtration and the clear alcoholic solution is reacted while being heated with the equivalent quantity of nicotinic acid.

The 3-(methyl-hydroxyethylamino)-2-hydroxy-propyl-theophylline-nicotinate obtained after the crystallization, has a melting point of 179 to 181° C. The yield is about 75% of the theory.

*Example 4*

To a stirred solution of 92.5 parts by weight of epichlorhydrin in 100 parts by volume of ethyl alcohol, are added dropwise 105 parts by weight of diethanolamine at 20 to 30° C. After the heat effect has subsided, the stirring is continued for 1 hour at 35° C. The 1-chloro-3-(dihydroxy-ethyl-amino)-propanol (2) thus produced is a very viscous, fast, colorless oil.

198 parts by weight of theophylline hydrate are converted into the sodium salt in 750 parts by volume of 96% ethyl alcohol with 40 parts by weight of caustic soda. Into the stirred suspension, the solution of the 1 - chloro - 3 - (dihydroxyethyl - amino) - propanol (2), the preparation of which has been described, is added to the reaction product during 2 hours while boiling the alcohol. After heating for a total of 4 hours, the deposited sodium chloride is filtered off from the reaction product and the alcoholic solution is concentrated by evaporation. The residue is a highly viscous 3-(dihydroxyethyl - amino) - 2 - hydroxy - propyl - theophylline which has strongly hydrophilic properties and is difficult to crystallize. The strong basic compound forms salts which can be crystallized with a few acids only.

*Example 5*

90 parts by weight of theophylline-hydrate are converted into the alkaline salt in 350 parts by weight of water with 20 parts by weight of caustic soda. While being well-stirred, the condensation product from 38 parts by weight of diethyl-amine and 46 parts by weight of epichlorhydrin in 40 parts by weight of methanol, are added dropwise to the solution of alkaline salt of theophylline in 1 hour while the solution is at a temperature of 80 to 90° C. Upon completion of the addition, a clear, slightly yellowish solution is formed. After evaporating the water, the strong viscous residue is taken up in alcohol and the suspended sodium chloride is separated by filtration. After vaporizing the alcohol, the 3-(diethyl-amino)-2-hydroxy-propyl-theophylline is obtained in the form of a very viscous, slightly yellowish oil. It forms salts with organic acids such as nicotinic acid.

In accordance with the foregoing methods, compounds of the general Formula I are prepared, and in turn the salts thereof, wherein the secondary amino radical

is dimethylamino, dipropylamino, dibutylamino, morpholino, piperidino, pyrrolidino, piperazino, monoalkylated piperazino (C- or N'-alkylated), (methyl)(ethyl)-amino, (ethyl)(β-hydroxyethyl)-amino, (methyl)(propyl) - amino, (methyl)(hydroxypropyl) - amino, N'-hydroxyethyl piperazino.

The 1,3 dialkyl xanthines are xanthines wherein $R_1$ is a methyl, ethyl, propyl, etc., i.e., a lower alkyl radical having up to six carbon atoms, and $R_2$ is akin to $R_1$.

When the compounds of this invention are prepared by the interaction of the 7-substituted xanthine halohydrins (fluoro, bromo, chloro) with a secondary amine, the reaction is carried out in the presence of a suitable alkaline hydroxide, e.g., an alkali metal or alkaline earth metal hydroxide, such as, sodium hydroxide, potassium hydroxide, barium hydroxide, sodium carbonate, etc., or alkali metal alcoholate, such as, sodium or potassium ethylate or propylate, in molar quantity to bind the released hydrogen halide. Advantageously, the reaction is carried out at a temperature in the range of 60 to 100° C.

When the compounds are prepared from the halogenoalkanolamines (bromo, fluoro, chloro alkanolamines) by interaction with the 1,3-dialkyl xanthines, as for example, theophylline, it is advantageous to employ the alkali metal salt of said xanthine, as for example, the sodium or potassium salt; and also to carry out the reaction in the presence of a monohydric lower alkanol or water.

It will be understood that the foregoing description of the invention and the examples set forth are merely illustrative of the principles thereof; accordingly, the appended claims are to be construed as defining the invention within the full spirit and scope thereof.

I claim:
1. Compounds of the group consisting of the free bases and the nicotinic acid salts thereof, wherein the free base has the general formula

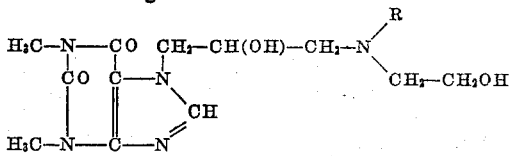

wherein R designates a member of the group consisting of methyl and hydroxyethyl radicals.

2. The nicotinic acid salt of 3-(methyl-β-hydroxyethylamino)-2-hydroxy-propyl-theophylline.

3. The nicotinic acid salt of 3-(dihydroxyethylamino)-2-hydroxy-propyl-theophylline.

4. Method of manufacturing the nicotinic acid salts of the bases having the general formula

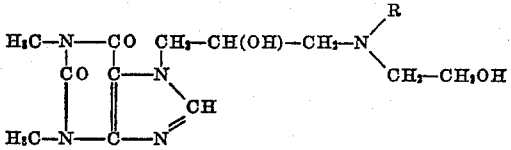

wherein R designates a member of the group consisting of methyl and hydroxyethyl radicals, which comprises heating the 7-(γ-halogen-β-hydroxy-propyl)-theophylline with the molar quantity of a member of the group consisting of methylaminoethanol and dihydroxy-ethylamine at a temperature of 70-80° C. in the presence of the molar quantity of an alkali metal hydroxide and a lower monohydric alkanol and reacting the formed raw theophylline base with the molar quantity of nicotinic acid.

5. Method of manufacturing the nicotinic acid salts of the bases having the general formula

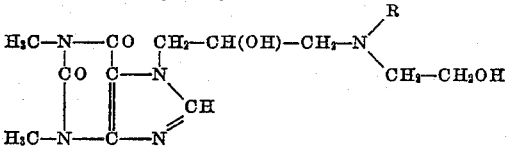

wherein R designates a member of the group consisting of methyl and hydroxyethyl radicals, which comprises reacting an alkanolamine of the general formula

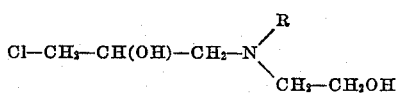

wherein R has the significance defined above, with theophylline in the presence of an alkali metal hydroxide and a lower monohydric alkanol at a temperature of about 60–100° C. and reacting the formed raw theophylline base with the molar quantity of nicotinic acid.

References Cited in the file of this patent
UNITED STATES PATENTS
2,641,598    Moussalli et al.           June 9, 1953

OTHER REFERENCES

Spiegelberg et al.: Helvetica Chimica Acta, vol. XXXIX, pp. 283–289 (1956).